Oct. 19, 1926.  1,603,947

V. L. GIBSON

PISTON ROD LUBRICATOR

Filed May 18, 1926

Inventor:
Victor L. Gibson,
By N.W. Crandall
Attorney.

Patented Oct. 19, 1926.

1,603,947

UNITED STATES PATENT OFFICE.

VICTOR L. GIBSON, OF LOS ANGELES, CALIFORNIA.

PISTON-ROD LUBRICATOR.

Application filed May 18, 1926. Serial No. 110,024.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to means for automatically lubricating piston rods of steam engines or the like. Its more important objects are; first, to provide a mechanical lubricator that is adapted for operation by the motion of the piston rod, to feed oil thereto when the rod is working, and to stop the oil feed when the rod is idle; second, to supply a device of this nature that will operate independently of temperature conditions; and, third, to accomplish the above results by means of a simple and relatively inexpensive construction.

My objects are attained in the manner illustrated in the accompanying drawing, in which—

Similar reference numerals apply to similar parts throughout the several views.

Figure 1:
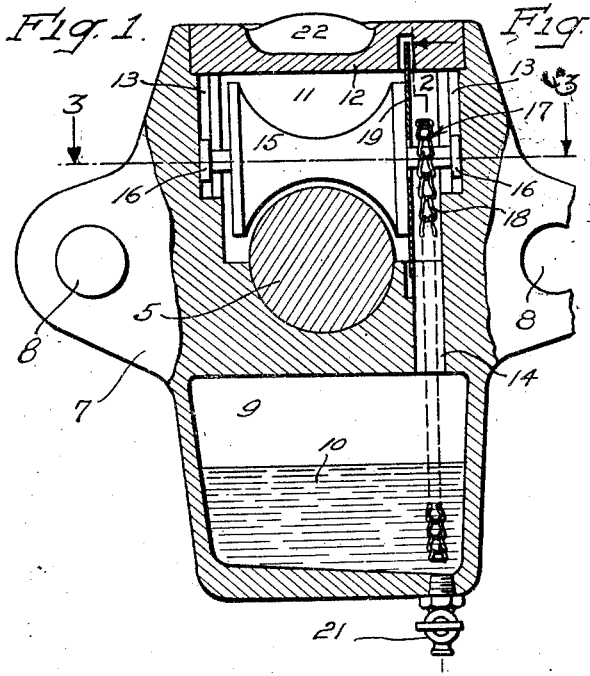
Figure 1 is a transverse elevational section of my device applied to a piston rod.
Figure 2:
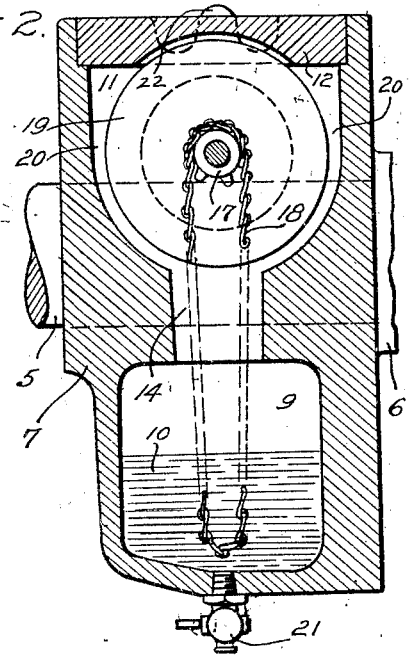
Figure 2 is a longitudinal elevational section of the above construction taken on the line 2—2 of Fig. 1.
Figure 3:
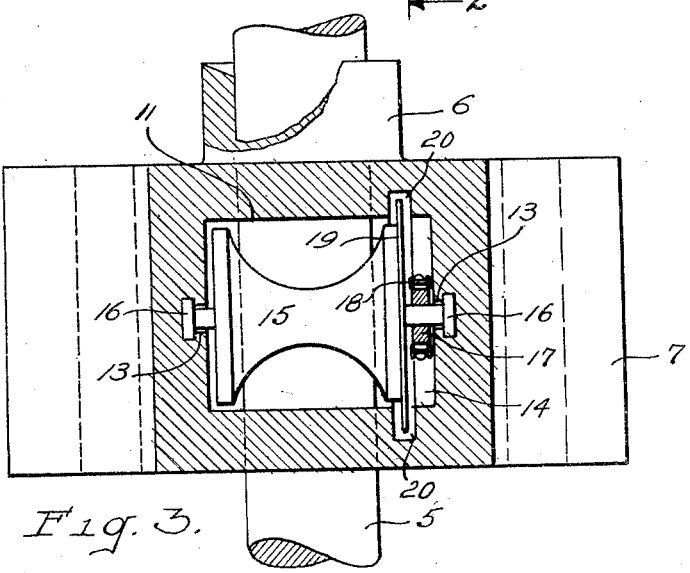
Figure 3 is a horizontal section of the device taken on the line 3—3 of Fig. 1.

The embodiment of my invention selected for illustrative purposes comprises a gland body of special construction, through which a piston rod 5 of a steam engine is adapted to reciprocate in the usual manner. The inner or cylindrical portion 6 of the gland is of the usual form used for piston rod stuffing boxes. The outer portion 7 is made much thicker than usual and requires longer studs in its holes 8 for compressing the packing, and for positioning it on the cylinder head of the engine.

The outer portion of the gland contains a chamber 9 for holding a supply of lubricating oil 10. Above this, and extending downwardly from the top to about the center of the piston rod, is a rectangular recess 11 covered by a plate 12. The upper half of the piston rod is exposed within this recess. The respective sides of the recess have vertical T-slots 13 therein, and a passage 14 of longitudinally elongated section establishes communication between chamber 9 and recess 11.

Within recess 11 is a transverse spool 15 supported by piston rod 5 and having its supporting surface of revolution conforming to and closely fitting the rod. The spool has a headed trunnion 16 at each end and these engage the respective T-slots 13 for keeping the spool properly positioned transversely to the piston rod. On one of the trunnions, above passage 14, is a sprocket 17, and hung upon this sprocket is an endless chain 18. The chain passes freely downward through passage 14, and dips into oil 10 without touching the bottom of chamber 9. Between sprocket 17 and spool 15 is a thin disk 19 having a central hole large enough to permit the head of trunnion 16 to pass through it. This disk rests upon the trunnion shaft and has its periphery within vertical slots 20 in the walls of recess 11. It is free to revolve by reason of its frictional engagement with the other parts, and acts both as a distributor of oil to spool 15 and as a shield between the spool and chain 18. A cock 21 permits of draining oil reservoir 9, and a finger grip 22 permits of removing cover 12.

It will be obvious from the foregoing description that the reciprocating motion of piston rod 5 will cause spool 15 to revolve alternately in opposite directions by reason of the frictional engagement of these parts. As a consequence of this, oil will be carried up from the reservoir by chain 18 over sprocket 17. It will flow over the adjacent surfaces of the sprocket and trunnion, through the central hole in disk 19 and over the surfaces of spool 15. The rolling contact between the spool and piston rod will distribute a film of oil to the rod as it reciprocates.

The size of the central hole in disk 19 regulates the amount of oil that passes therethrough to the surface of spool 15 and, when the adjustment of this feature is made, the regulation is fixed. A more rapid feed of oil may be had by notching the edges of this central hole of the disk.

I desire particularly to call attention to the fact that the lubricating portions of my device may all be removed from the gland without disturbing the piston rod; and similarly the piston rod may be removed without disturbing the lubricating mechanism.

Having thus fully described my invention, I claim—

1. In combination with a piston rod; a gland containing an oil reservoir at the bottom, and a chamber at the top through which the upper portion of the rod is adapted to reciprocate; a transverse spool within the chamber resting upon the rod and adapted for being rotated by the longitudinal motion thereof; and means for causing the rotation of the spool to lift oil from the reservoir to be distributed over the surface of the spool and thence to the rod.

2. In combination with a piston rod; a gland containing an oil reservoir at the bottom, and a chamber at the top through which the upper portion of the rod is adapted to reciprocate, said chamber being in communication with the reservoir through a vertical passage laterally disposed with respect to the rod; a transverse spool within the chamber resting upon the rod and adapted for being rotated by the longitudinal motion thereof; a trunnion upon the spool over said passage; and an endless chain supported by the trunnion extending downwardly through the passage into the reservoir.

3. In combination with a horizontal piston rod; a gland containing an oil reservoir at the bottom, and a chamber at the top through which the upper portion of the rod is adapted to reciprocate, said chamber being in communication with the reservoir through a vertical passage laterally disposed with respect to the rod; a transverse spool within the chamber resting upon the rod and adapted for being rotated by the longitudinal motion thereof; a trunnion upon the spool with a sprocket thereon over said passage; and an endless chain hung upon the sprocket and extending downwardly through the passage into the reservoir.

4. In combination with a horizontal piston rod; a gland containing an oil reservoir at the bottom, and a chamber at the top through which the upper portion of the rod is adapted to reciprocate, said chamber being in communication with the reservoir through a vertical passage laterally disposed with respect to the rod, and there being opposed vertical T-slots in the side walls of the chamber; a transverse spool within the chamber resting upon the rod and adapted for being rotated by the longitudinal motion thereof, the spool having headed trunnions at its respective extremities engaging the T-slots; a sprocket upon one of the trunnions over said passage; an endless chain hung upon the sprocket and extending downwardly through the passage into the reservoir; and a loose disk on the last said trunnion between the sprocket and the spool; said disk having a central hole therethrough slightly larger than the trunnion shaft and through which said shaft passes.

VICTOR L. GIBSON.